United States Patent [19]

Tilman

[11] Patent Number: 4,824,497
[45] Date of Patent: Apr. 25, 1989

[54] ATTACHMENT OF A THERMOPLASTIC EXTRUDED FASTENER TO A NON-EXTENSIBLE WEB

[75] Inventor: Paul A. Tilman, New City, N.Y.

[73] Assignee: Minigrip, Inc., Orangeburg, N.Y.

[21] Appl. No.: 46,510

[22] Filed: May 6, 1987

[51] Int. Cl.⁴ ............................................. A44B 18/00
[52] U.S. Cl. .................................. 156/66; 156/244.15; 156/244.25; 383/63; 383/97; 428/99; 428/100; 428/179; 428/188
[58] Field of Search ............ 156/66, 143, 195, 244.15, 156/244.25; 383/63, 97; 428/99, 100, 179, 188

[56] References Cited

U.S. PATENT DOCUMENTS 2,713,381 7/1955 Seck .................................. 156/195 X
3,919,026 11/1975 Mizutani et al. ..................... 156/143
4,174,984 11/1979 Meadows ............................. 156/143

Primary Examiner—Robert A. Dawson
Attorney, Agent, or Firm—Hill, Van Santen, Steadman & Simpson

[57] ABSTRACT

An elongate continuous plastic fastener strip having a profile for interlocking engagement with another profile and having a web for attachment to a film with a member coextensive with the strip and attached thereto which prevents longitudinal stretching of the strip when a longitudinal force is applied thereto particularly concurrent with the application of heat to attach the strip to a plastic film. The member preventing extensibility is attached such as by coextrusion with the strip, by sandwiching between layers in the web or by attachment in the form of filaments to the web.

18 Claims, 1 Drawing Sheet

ATTACHMENT OF A THERMOPLASTIC EXTRUDED FASTENER TO A NON-EXTENSIBLE WEB

BACKGROUND OF THE INVENTION

The present invention relates to improvements in fastener strips of the type formed of an extruded plastic with an interlocking profile thereon shaped to interlock with another profile.

Fastener strips of this kind are normally utilized by attaching to a film of plastic such as of sheet material or where the plastic is formed into a container. The fastener strip is frequently bonded to the plastic film by heat to cause the plastic of the strip and of the film to weld to each other.

It has been found, particularly with heavy duty fastener applications, that the fusion temperatures required to bond the fastener onto a film will cause the fastener web and/or the fastener itself to elongate beyond normal tolerances. In the attachment of the fastener strip to the film in order to obtain intimate contact between the film and the strip, longitudinal forces are applied both to the film and the strip to remove wrinkles and to insure intimate surface contact. In the application of the longitudinal forces concurrent with the application of heat to cause bonding, the fastener may elongate beyond normal tolerances as it enters a state of flux or yieldability at the time of bonding to the sheet material, resulting in a distortion of the profile and/or a curvature or warping of the line of contact between the strip and the film.

In many practical applications, it is impossible to control the longitudinal tension applied to the strip required for obtaining the intimate contact between the strip and the film and even allowing for sophisticated tension systems, the rate of elongation of the material with the application of heat cannot be adequately controlled. This is particularly true in the case of materials of different thicknesses which have been manufactured under different conditions and at different draw-down rates. In the attachment of a continuous fastener strip to a film with the application of heat, a longitudinal force or stretching force may be applied to the strip and applied simultaneously to the film. Heat is applied at the area where the web of the strip overlies the film to cause a fusion of the plastic and a bonding of the strip to the film. The longitudinal force is practically applied to the web of the strip and due to the softening of the plastic on the web of the strip, the web will elongate whereas the cooler profile at its side will not elongate thereby causing a curvature in the strip as an entity. The elongation of the web can also be transferred to the fastener profile at the edge causing additional distortion. This distortion is undesirable in the final product and further problems and distortion of the two structures will occur upon cooling where increasing distortion and uneven matching of the closure to its opposing joining member result.

It is accordingly an object of the present invention to provide an improved fastener strip and method and apparatus for making the strip wherein a non-extensible reinforcement is associated with the fastener strip and especially the web of said strip so that a longitudinal force can be applied to it while being attached to a film without distortion and wrinkling of the final product.

A further object of the invention is to provide an improved method and apparatus for making a fastener strip and attaching the fastener strip to a film wherein a more uniform, stronger and satisfactory attachment results and the finished product lies smooth without distortion of the fastener profile at the edge of the strip.

A further object of the invention is to provide an improved structure and method of making a fastener strip with a non-extensible reinforcement in the web of the fastener strip wherein the reinforcement can be associated with the strip or attached thereto in relatively high speed production procedures and without adversely affecting the speed or quality of production.

Other objects and advantages will become more apparent with the teaching of the principles of the invention in connection with the disclosure of the preferred embodiments thereof in the specification, claims and drawings, in which:

DESCRIPTION OF THE PREFERRED EMBODIMENTS

Figure 1:
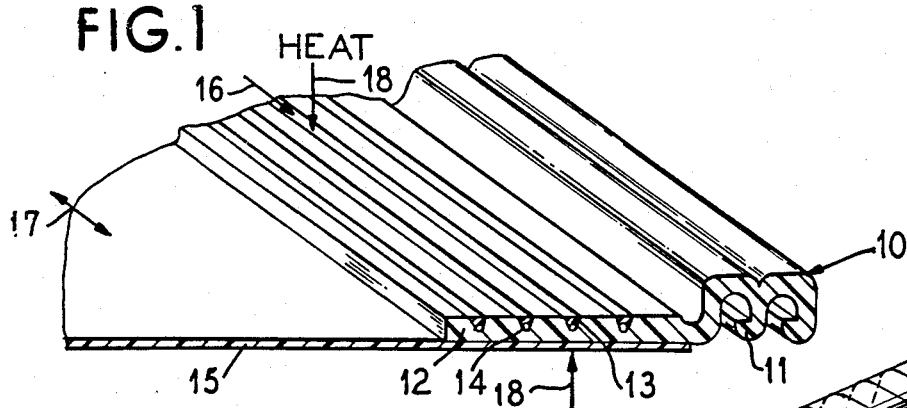
FIG. 1 is a fragmentary sectional view taken through a combined fastener strip and film illustrating the manner of heat attachment of the fastener strip to the film and illustrating one form of reinforced fastener strip.

FIG. 1 illustrates a continuous elongate fastener strip 10 having profiles 11 at the edge which are shaped to interlock with other mating profiles. The fastener strip 10 has a web 12 at one edge which is used for attaching the profiles to a film 15. For example, the film 15 may be the top wall of a container with a similar film at the other side of the container opening with another mating profile strip. More usually the features of the invention are employed with a heavy duty fastener such as where the fastener will lock to another coacting member to attach the side of a plastic film of substantial size.

Conventionally, the fastener strip 10 is manufactured and stored such as on rolls and thereafter used by attaching to the film. In some instances, the attachment may occur promptly after the fastener has been manufactured and has cooled. In either event, particularly with heavy fastener strips 10, to obtain intimate surface-to-surface contact between the fastener strip 10 and the film 15, a longitudinal tension is applied to the strip and may also be applied to the film 15. The web 12 of the strip is bonded to the film by the application of heat so that a molten plastic bond is formed between the web of the fastener strip 10 and the film. For this purpose heat may be applied to one or both surfaces of the web 12 and the film 15 as shown by the arrowed lines 18.

Since the thickness of the web is substantially less than that of the adjacent interlocking profile and since the bonding heat is applied only to the web, the longitudinal strength of the web 12 of the fastener strip is reduced, when the strip is sealed to the film. This will cause the web to become longer than the profiles and a curvature in the straightness of the fastener strip will result.

To avoid the foregoing, means are attached to the strip, and preferably to the web which offer resistance and substantially prevent elongation of the web. The resultant fastener strip has substantial longitudinal strength and resistance to elongation from the application of a longitudinal force. While principally the addition of reinforcing means to the strip is to substantially eliminate extensibility when heat is applied, the addition of longitudinal strength has a secondary advantage in resulting in a stronger strip which also strengthens the film at the edge to which the fastener strip is attached and the strengthened web of the strip additionally prevents distortion of the profiles during use of the strip and its attached film and improves the security and integrity of the attachment between the strip and its coacting strip.

Figure 2:
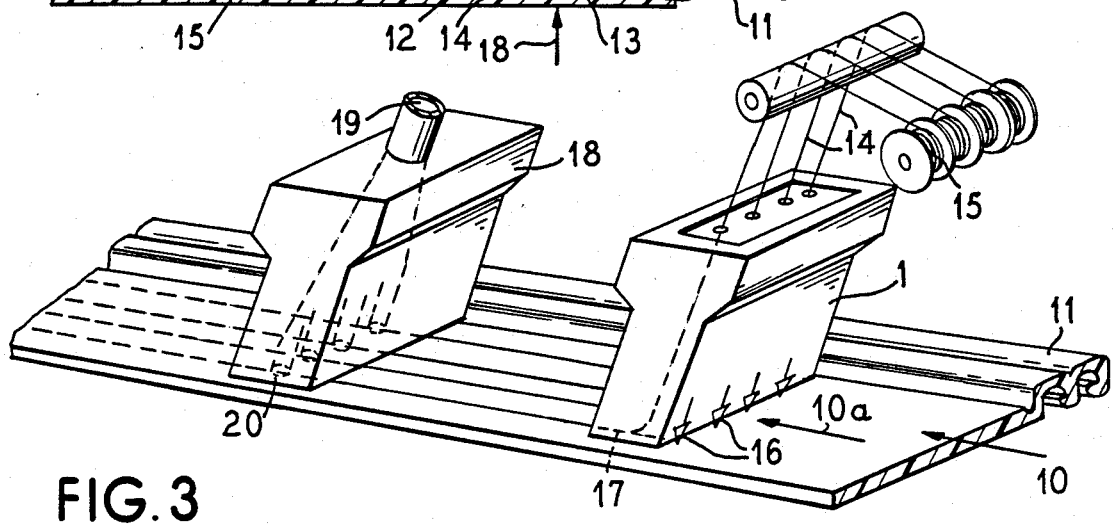
FIG. 2 is a fragmentary perspective view illustrating one method for reinforcing a fastener strip in accordance with the principles of the present invention.

In the form shown in FIGS. 1 and 2, the longitudinal strength of the web of the strip is strengthened by embedding filaments 14 in grooves 13 in the web 12.

FIG. 2 illustrates a form in which the filaments are embedded in pre-extruded or pre-manufactured or just manufactured fastener strips. The strip is drawn longitudinally in the direction indicated by the arrowed line 10a drawn beneath a head 1 which grooves the web 12 of the strip and which lays non-extensible filaments 14 in the grooves. The filaments 14 are fed off of supply spools 15 through openings in the head 1. The head has groove formers 16 such as knives or heated elements which form a series of grooves 13 for receiving the filaments at the location 17.

After passing the head 1, the strip passes beneath a second head 18 which is fed with molten plastic through a supply 19 through channels 20 to deposit the plastic onto the top of the filaments 14 in the grooves 13 and embed them therein.

In another form, the individual longitudinal non-extensible filaments may be embedded in the web 10 at the time of the extrusion of the strip. The filaments or reinforcement strips may be of various materials, such as oriented nylon, carbon, rayon or other material which is essentially non-extensible and which does not become extensible with heat and which also may be expressed as a material which has a strain stress factor or rate which remains essentially constant at elevated temperatures, or in other words a thermal expansion strength property which does not significantly lower at temperatures which are used to bond plastic sheets together. Primarily, however, the function of the filaments or reinforcing elements is to hold the length of the web 12 true and not permit extension with the application of longitudinal force particularly when the web is softened by the application of heat.

Figure 3:
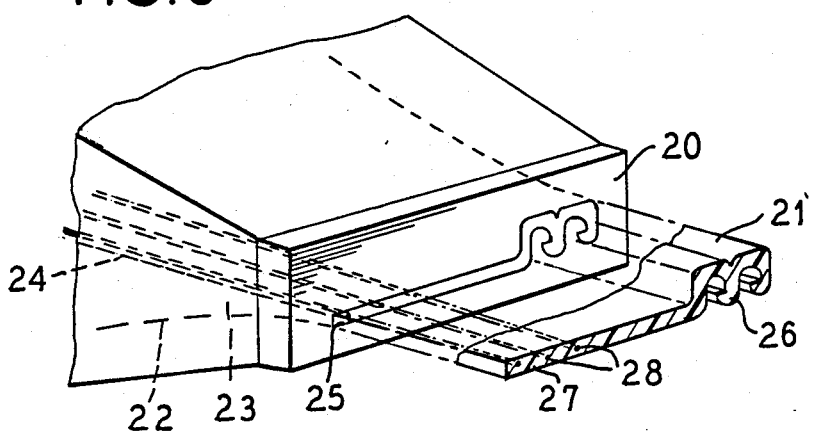
FIG. 3 is a fragmentary perspective view illustrating another way in which a fastener strip can be reinforced in accordance with the present invention.

In the arrangement of FIG. 3, an extrusion head 20 is provided with a shaped opening 25. The opening is shaped to extrude a continuous fastener strip 21 having shaped profiles 26 at one edge and a web 27 of the strip at the other edge. Embedded within the web 27 are strengthening filaments 28. The filaments are shown at 24 where they are supplied and at 28 after they are embedded.

For extruding the strip, melted extrudate 23 is contained in a shaped channel 22 and forced through the die head 20. The channel 22 converges toward the die opening 25 and individual filaments 24 are fed into the center of the plastic extrudate at a location so they will emerge centered within the web, that is the filaments 28 will be located embedded within the center of the web 27 as illustrated in FIG. 3. The filaments or reinforcements thus will provide a web which is essentially non-extensible, and will remain non-extensible even with the application of heat such as when the web is bonded onto a plastic film.

Figure 4:
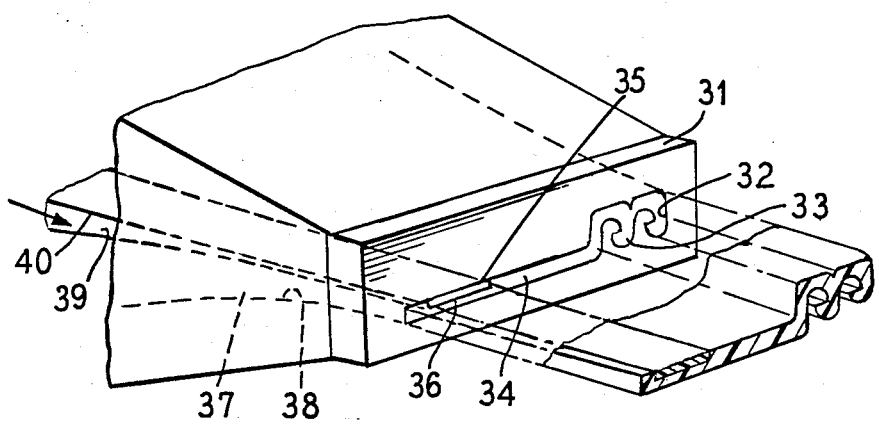
FIG. 4 is a fragmentary perspective view illustrating a still further way of reinforcing a fastener strip.

In the arrangement of FIG. 4, an extrusion head 31 is provided with a shaped slot 32 shaped to form a fastener strip with a profile portion 33 and a web portion 34. The slot on the web portion is shaped and arranged so that reinforcing strips or filaments 36 will be embedded in the web sandwiched between the base of the web portion and a sandwiching strip 35 which is laid in a slot on the web to sandwich or encapsulate the filaments 36 while the molten extrudate is being extruded. The filaments are shown supplied at 39, and at 36 after being embedded. The extrudate is shown supplied at 40 and at 35 after it is sandwiched into the web. The materials for forming the strip are fed to the die 31 by a shaped passage 38 upstream of the die providing a passage for the molten strip extrudate 37, for the supply filaments 39 and for the second extrudate with a higher pressure melt material 40 which is extruded onto the web during the extrusion process. It will become apparent to those versed in the art from the foregoing that in one form, the filaments 36 may be sandwiched between the strip 35 and the base portion of the web 34, or as a further alternative, the strip portion 35 may itself be a non-extensible reinforcement member having threads or like means therein which are non-extensible or which do not become extensible with the application of heat such as when the strip is heat bonded to a film.

Thus, it will be seen that there has been provided a method and apparatus for making an elongate plastic strip having a continuous profile thereon shaped for interlocking engagement with another profile wherein the strip has and integral web member for attachment of the strip to a film and has an elongation preventing element associated with the strip which substantially prevents elongation with the application of longitudinal forces in the direction of the strip especially when the strip is heated. While a preferred form shows the filaments or other means associated with the web of the fastener, in some instances it may be preferred to similarly reinforce the edge of the film 15 and the foregoing described concepts would be utilized in reinforcing the edge of the film so that distortion and stretching does not occur with the application of a longitudinal force and heat.

The reinforcement may be employed by addition to an existing pre-manufactured strip or utilized in the manufacture of the strip in a single operation as described above. A strip which cannot be elongated with the application of processing and operational forces provides improved handling and storage facility as well as improved stability for use in attachment and separation from a mating strip. The strip can be heat attached or heat bonded by other means with the application of a longitudinal force without distortion and an improved combined strip and plastic film will result.

I claim:

1. A shaped interlocking profile strip, comprising in combination:

an elongate plastic strip having a continuous profile thereon shaped for interlocking engagement with another profile;

said strip having an integral web member located laterally of the profile for attachment of the strip to a film for a bag wall;

and an elongation preventing element associated with said web substantially preventing elongation thereof with the application of a longitudinal force in the direction of the strip so that warping of the strip and profile is prevented.

2. A shaped interlocking profile strip constructed in accordance with claim 1:
wherein said elongation preventing element is embedded in the plastic of the web.

3. A shaped interlocking profile strip constructed in accordance with claim 1:
wherein said elongation preventing element is sandwiched between layers of plastic forming said web member.

4. A shaped interlocking profile strip constructed in accordance with claim 1:
wherein said elongation preventing element has a property of retaining strength with the increase in temperature to a level required to soften the plastic of the strip so that with the application of heat elongation of the web is substantially prevented or reduced.

5. A shaped interlocking profile strip constructed in accordance with claim 1:
wherein said elongation preventing element is in the form of multiple filaments embedded in the plastic of the web member.

6. A shaped interlocking profile strip constructed in accordance with claim 1:
wherein said elongation preventing element is attached solely to the integral web member so that elongation of the web member is prevented with the increase in heat or the application of longitudinal stresses on the web member.

7. A shaped interlocking profile strip constructed in accordance with claim 1:
wherein said web member has longitudinal grooves in a surface with set elongation preventing element in the form of filaments embedded in the grooves.

8. The method of longitudinally reinforcing an elongate plastic strip having a shaped interlocking profile shaped for interlocking engagement with another profile and having an integral web member laterally of the profile which comprises the steps of:
attaching an elongation preventing element to the web coextensive therewith so that a longitudinal elongation of the web is substantially prevented with the application of a longitudinal force in the direction of the strips.

9. The method of longitudinally reinforcing an elongate plastic strip having a shaped interlocking profile shaped for interlocking engagement with another profile and having an integral web member in accordance with the steps of claim 8:
wherein the elongation preventing element is attached by extruding the strip and simultaneously extruding the web in layers with the elongation preventing element interlaid between said layers.

10. The method of longitudinally reinforcing an elongate plastic strip having a shaped interlocking profile shaped for interlocking engagement with another profile and having an integral web member in accordance with the steps of claim 8:
wherein the elongation preventing element is attached by securing multiple filaments in grooves in the web of the strip.

11. The process of making a film with an attached strip having a continuous profile thereon shaped to interlockingly engage with another profile, comprising the steps:
providing a profile strip having a web with substantial longitudinal strength and resistance to elongation with the application of a longitudinal force;
applying the strip to a film while applying a longitudinal force to the strip to obtain intimate contact between the film and the strip;
simultaneously applying a longitudinal force to the film at the location where the strip is to be sealed to the film for obtaining said intimate contact between the web and strip;
and bonding the strip to the film whereby the profiles or the webs of the strip are not distorted and warped due to stretching of the strip.

12. The process of making a film with an attached strip having a continuous profile thereon shaped for interlocking engagement with another profile in accordance with the steps of claim 11:
wherein a longitudinal force is applied to the film simultaneously with the force to the strip at the location where the strip is to be joined to the film for obtaining said intimate contact.

13. The process of making a film with an attached strip having a continuous profile thereon shaped for interlocking engagement with another profile in accordance with the steps of claim 11:
wherein the strip and film are heat bonded to each other with the application of heat at the area of said intimate contact.

14. The process of making a film with an attached strip having a continuous profile thereon shaped for interlocking engagement with another profile in accordance with the steps of claim 11:
wherein said film is in the form of a container with coextensive fastener strips extending along an opening at the top.

15. A mechanism for making a profile strip having a continuous profile thereon shaped for interlocking engagement with another profile, comprising:
means for continuously passing an elongate fastener strip along a path with the strip having a shaped profile thereon and a web laterally of the profile;
and means for attaching to the web at an attachment location a continuous member coextensive with the web having a lower coefficient of thermal expansion than said strip so that a strip is formed whereby with the application of heat longitudinal extension of the web will be substantially diminished.

16. A mechanism for producing a profile strip having a continuous profile thereon shaped for interlocking engagement with another profile, comprising:
an extrusion head having an opening shaped for forming an interlocking profile and an integral web whereby a continuous fastener strip is extruded therefrom;
and means for supplying a continuous non-elastic element coextensive with the web so that an integral web is formed that is non-extensible with the application of longitudinal force.

17. The method of making a fastener strip comprising the steps of:
extruding a shaped fastener strip through an extrusion die having a portion forming a profile and a connecting portion forming a web of the strip;
and feeding a reinforcing filament means into the plastic upstream of the die opening in alignment with the web so that the filaments are embedded in the plastic of the web as the strip emerges from the die.

18. The method of making a plastic fastener strip comprising the steps:

extruding a flexible plastic fastener strip through an extrusion die having a portion forming a shaped profile on the strip and another portion forming a connected web portion;

feeding a second plastic into the die at the location of the web opening so that plural layers of web emerge from the die;

and feeding reinforcing filament means into the web portion of the die opening so that said filament means are sandwiched between the layers of plastic of the web.

* * * * *